(12) United States Patent
Sanfilippo (10) Patent No.: US 12,007,482 B2
(45) Date of Patent: Jun. 11, 2024

(54) OPTICAL PROXIMITY SENSOR AND CORRESPONDING METHOD OF OPERATION

(71) Applicant: STMICROELECTRONICS S.r.l., Agrate Brianza (IT)

(72) Inventor: Delfo Nunziato Sanfilippo, Catania (IT)

(73) Assignee: STMICROELECTRONICS S.r.l., Agrate Brianza (IT)

( * ) Notice: Subject to any disclaimer, the term of this patent is extended or adjusted under 35 U.S.C. 154(b) by 952 days.

(21) Appl. No.: 17/011,867

(22) Filed: Sep. 3, 2020

(65) Prior Publication Data

US 2021/0072386 A1 Mar. 11, 2021

(30) Foreign Application Priority Data

Sep. 6, 2019 (IT) .................. 102019000015761

(51) Int. Cl.
*G01S 17/36* (2006.01)
*G01J 1/42* (2006.01)
(Continued)

(52) U.S. Cl.
CPC .............. *G01S 17/36* (2013.01); *G01J 1/4204* (2013.01); *G01S 7/4816* (2013.01); *G02B 1/11* (2013.01); *G02B 3/0056* (2013.01); *G02B 5/20* (2013.01)

(58) Field of Classification Search
CPC ...... G01S 17/36; G01S 7/4816; G01J 1/4204; G02B 1/11; G02B 3/0056; G02B 5/20
See application file for complete search history.

(56) References Cited

U.S. PATENT DOCUMENTS

2005/0035361 A1* 2/2005 Peterson ............... H10K 50/86
349/61
2007/0091295 A1 4/2007 Xu et al.
(Continued)

OTHER PUBLICATIONS

N. Lodha, Monolithic Integration of LEDs and SPADs in Standard CMOS Tech-nology for Optical Joystick Application (M.Sc. thesis), Delft University ofTechnology (TU Delft), 2012. (Year: 2012).*
(Continued)

*Primary Examiner* — Isam A Alsomiri
*Assistant Examiner* — Joseph C Fritchman
(74) *Attorney, Agent, or Firm* — Seed IP Law Group LLP (57) ABSTRACT

An optical proximity sensor comprises a solid-state photo-electric converter, a biasing circuit for biasing the solid-state photo-electric converter, and a drive circuit. The drive circuit is configured to control the biasing circuit to apply to the photo-electric converter a bias signal modulated between a first value and a second value, the second value different from the first value, wherein a modulated optical signal is emitted by the solid-state photo-electric converter towards a target object. The drive circuit is configured to receive an electrical output signal from the solid-state photo-electric converter, the electrical output signal being a function of a modulated optical signal received at the solid-state photo-electric converter as a result of reflection of the emitted modulated optical signal at the target object. The drive circuit is configured to perform a phase comparison of the modulated bias signal against the electrical output signal and produce, as a result of the phase comparison, a phase shift signal. The drive circuit is configured to compute a distance between the optical proximity sensor and the target object as a function of the phase shift signal.

18 Claims, 3 Drawing Sheets

(51) Int. Cl.
G01S 7/481 (2006.01)
G02B 1/11 (2015.01)
G02B 3/00 (2006.01)
G02B 5/20 (2006.01)

(56) References Cited

U.S. PATENT DOCUMENTS

2016/0320173 A1* 11/2016 Royo Royo ......... G01B 9/0207
2022/0052083 A1* 2/2022 Tsukuda ................ G01S 17/894

OTHER PUBLICATIONS

Chatterjee, A., Bhuva, B., "High-Speed Light Modulation in Avalanche Breakdown Mode for Si Diodes", IEEE Electron Device Letters, 25(9), 2004 (Year: 2004).*
Dutta et al., "The Avalanche-Mode Superjunction LED", IEEE Transactions on Electron Devices, 64(4), 2017 (Year: 2017).*
Nagy et al., "Afterpulse and delayed crosstalk analysis on a STMicroelectronics silicon photomultiplier," *Nuclear Instruments and Methods in Physics Research A* 759:44-49, 2014.
Pagano et al., "Potentialities of Silicon Photomultiplier," 2014 Proceedings of SPIE—The International Society for Optical Engineering, San Francisco, California.
Finocchiaro et al., "Characterization of a Novel 100-Channel Silicon Photomultiplier—Part I: Noise," *IEEE Transactions on Electron Devices* 55(10):2757-2764, 2008.
Finocchiaro et al., "Characterization of a Novel 100-Channel Silicon Photomultiplier—Part II: Charge and Time," IEEE *Transactions on Electron Devices* 55(10):2765-2773, 2008.
Foix et al., "Lock-in Time-of-Flight (ToF) Cameras: A Survey," *IEEE Sensors Journal 11*(3):1-10, 2011.

He et al., "Depth Errors Analysis and Correction for Time-of-Flight (ToF) Cameras," *Sensors 17*(92):1-18, 2017.
Mazzillo et al., "Quantum Detection Efficiency in Geiger Mode Avalanche Photodiodes," *IEEE Transactions on Nuclear Science 55*(6):3620-3625, 2008.
Mazzillo et al., "Silicon Photomultiplier Technology at STMicroelectronics," *IEEE Transactions on Nuclear Science 56*(4):2434-2442, 2009.
Mazzillo et al., "Timing Performances of Large Area Silicon Photomultipliers Fabricated at STMicroelectronics," *IEEE Transactions on Nuclear Science 57*(4):2273-2279, 2010.
Mirzoyan et al., "Light emission in Si avalanches," *Nuclear Instruments and Methods in Physics Research A 610*:98-100, 2009.
Niclass et al., "Design and Characterization of a CMOS 3-D Image Sensor Based on Single Photon Avalanche Diodes," *IEEE Journal Of Solid-State Circuits 40*(9): 1847-1854, 2005.
Niclass et al., "Single-Photon Synchronous Detection," IEEE Journal Of Solid-State Circuits 44(7):1977-1989, 2009.
Norgia, et al. "High resolution self-mixing laser rangefinder", *Review of Scientific Instruments*, vol. 83, 2012, 6 pages.
Pagano et al., "The Silicon Photomultiplier: Optimum Design, Performance, Applications," Fotonica AEIT Italian Conference on Photonics Technologies, May 12-14, 2014, Naples, Italy, 4 pages.
Ronzhin et al., "Study of Timing Properties of SiPMs at Fermilab," IEEE Nuclear Science Symposium and Medical Imaging Conference Record, Oct. 29-Nov. 3, 2012, Anaheim, California, pp. 245-249.
STMicroelectronics, "A new generation, long distance ranging Time-of-Flight sensor based on ST's FlightSense™ technology," Product Datasheet, VL53L1X, Feb. 2018, 36 pages.
Karami et al., "Light emission enhancement in Light Emitting Single-Photon Avalanche Diodes (LESPADs)," *Optik 126*: 4146-4148, 2015.

* cited by examiner

OPTICAL PROXIMITY SENSOR AND CORRESPONDING METHOD OF OPERATION

BACKGROUND

Technical Field

The description relates to optical proximity sensors. One or more embodiments may rely on the measurement of phase difference between a (periodically) modulated optical signal emitted from a device and a corresponding optical signal received at the device for evaluating the distance to a certain object reflecting (at least partially) the optical signal.

Description of the Related Art

Optical proximity sensors are used in a wide variety of applications. For instance, they are used in many sectors of industry and research for distance measurement, as well as in engineering for quality control and process monitoring. Non-contacting sensor systems represent a desirable solution especially in confined spaces.

Optical proximity sensors are also applicable in the fields of automation, chemical industry, medical technology, special machine construction, autonomous robots, mobile phones and consumer electronics.

Other possible applications involving optical proximity sensors may include, by way of non-limiting examples, user detection (e.g., to power on/off and locking/unlocking devices), autonomous triggering of low-power mode for IoT devices, service robots and vacuum cleaners, drones, smart shelves and vending machines, sanitary devices, smart buildings and smart lighting devices, gesture recognition devices.

BRIEF SUMMARY

Optical proximity sensors may rely on time-domain reflectometry (also called direct time-of-flight sensors), frequency-domain reflectometry (also called phase difference sensors) and light intensity evaluation.

Figure 1:
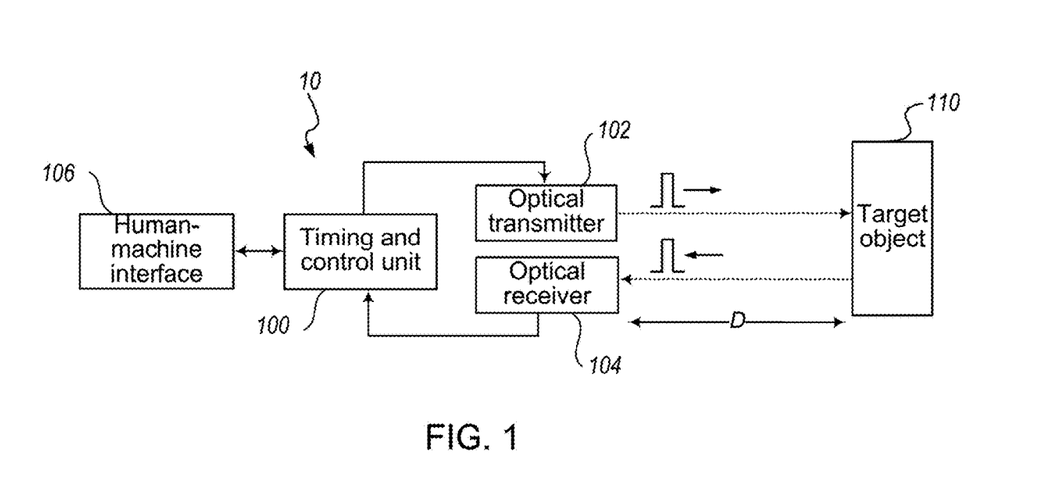
FIGS. 1 and 2 are schematic block diagrams exemplary of optical proximity sensors and have already been described in the foregoing.

As exemplified in FIG. 1, an optical proximity sensor 10 relying on direct time-of-flight techniques may comprise a timing and control unit 100, an optical transmitter 102, an optical receiver 104 and optionally a human-machine interface 106. The timing and control unit 100 generates a control signal for the optical transmitter 102 which causes emission of an optical pulse from the optical transmitter, and at the same time $t_{start}$ triggers a timer internal to the timing and control unit 100. The optical pulse propagates towards a target object 110 and some of the backscattered light travels back to the optical receiver 104. An optical pulse being sensed at the receiver 104 causes the internal timer to stop at a certain time $t_{stop}$. In an exemplary implementation, the distance D between the optical proximity sensor 10 and the target object 110 may be computed as $D = _c \cdot \Delta t/2$, where c is the propagation speed of light and $\Delta t = t_{stop} - t_{start}$.

Mechanically scanning LIDAR devices (Light Detection And Ranging) for use, e.g., in advanced driver assistance systems (ADAS) are exemplary of optical proximity sensors relying on direct time-of-flight techniques.

It is noted that sensors relying on time-domain reflectometry are often not suitable to provide low cost rangefinders with good resolution over short distances since this may involve the use of expensive broadband electronics, e.g., because a time resolution of a few picoseconds (1 ps= $10^{-12}$ s) is involved for obtaining a distance resolution in the order of a millimeter (1 mm=$10^{-3}$ m). Also, sensors relying on time-domain reflectometry may often involve bulky and complex instrumentation, which may not be suitable for low cost applications.

Figure 2:
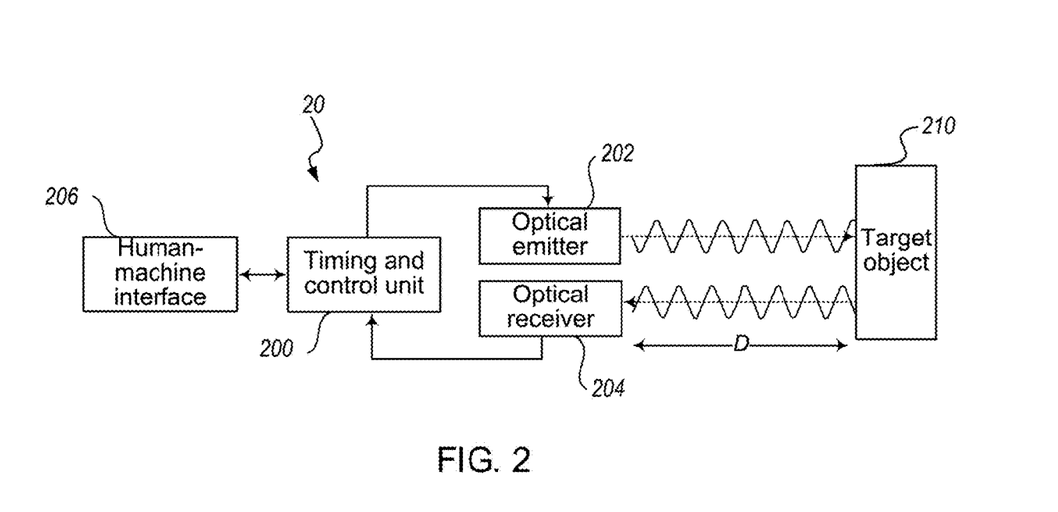

As exemplified in FIG. 2, a optical proximity sensor 20 relying on frequency-domain reflectometry may comprise a timing and control unit 200, an optical transmitter 202, an optical receiver 204 and optionally a human-machine interface 206. The timing and control unit 200 generates a control signal for the optical emitter 202 which causes emission of an optical signal, whose intensity (amplitude) is modulated over time, from the optical transmitter 202. The intensity of the emitted optical signal may be modulated periodically and expressed, for instance, as $I_{TX}=I_1(1+\cos(\omega_m t+\Phi_{TX}))$, where $\omega_m$ is the modulation frequency (in rad/s) of the emitted optical signal and $\Phi_{TX}$ is the phase of the emitted optical signal. The optical signal propagates towards a target object 210 and a reflected optical signal having intensity $I_{RX}(t)=I_2(1+\cos(\omega_m t+\Phi_{RX}))+I_{BL}$ travels back to the optical receiver 204, where Wm is the modulation frequency (in rad/s) of the received optical signal (equal to the modulation frequency of the emitted optical signal), $\Phi_{RX}$ is the phase of the received optical signal and $I_{BL}$ is the intensity of the environmental background light. The reflected optical signal (e.g., the envelope thereof) received at the receiver 204 is compared to the emitted (reference) optical signal to determine a phase shift $\Delta\Phi=\Phi_{RX}-\Phi_{TX}$ between the emitted and received optical signals. In an exemplary implementation, the distance D between the optical proximity sensor 20 and the target object 210 may be computed as $D=_c \cdot \Delta\Phi/(2\omega_m)$, where c is again the propagation speed of light.

Sensors relying on frequency-domain reflectometry are often not suitable to provide low cost optical sensors insofar as they may involve complex systems, expensive electronics, accurate mechanical alignment between light emitter 202 and light detector 204, and temperature calibration.

Sensors relying on light intensity evaluation may be affected by different light intensity environmental conditions and may involve a calibration phase and/or the implementation of calibrated look-up tables.

Despite the extensive activity in the area, further improved solutions are desirable.

For instance, low cost optical proximity sensors suitable for short-range distance measurements (e.g., with a range of approximately 0.5 m) are desirable.

One or more embodiments of the present disclosure contribute in providing such improved solutions.

According to one or more embodiments, such improved solutions can be achieved by means of an optical proximity sensor having the features set forth in the described embodiments that follow.

One or more embodiments may relate to a corresponding method of operating the optical proximity sensor.

One or more embodiments may provide an optical proximity sensor comprising at least one (solid-state) device acting both as light emitter and as light detector. An array of single photon avalanche diodes (SPADs), an array of avalanche photodiodes (APDs), or a silicon photomultiplier (SiPM) may be exemplary of such a device.

In one or more embodiments, the optical proximity sensor may comprise a driver circuit configured for biasing said emitter/detector device with a (periodically) modulated signal to cause emission of a modulated optical signal (e.g., having an intensity which varies over time).

In one or more embodiments, the driver circuit may be (fully) integrated within the optical proximity sensor to provide a so-called "single-chip" device. Alternatively, the driver circuit may be implemented on a different chip and coupled to the emitter/detector device.

In one or more embodiments, the optical parts of the sensor (e.g., lenses and/or coatings and/or layers with optical properties) may be (fully) integrated within the optical proximity sensor, e.g., by process integration. Alternatively, the optical parts of the sensor may be discrete components.

One or more embodiments may thus facilitate providing low cost optical proximity sensors for short-range measurements with improved accuracy.

BRIEF DESCRIPTION OF THE SEVERAL VIEWS OF THE DRAWINGS

One or more embodiments will now be described, by way of example, with reference to the annexed figures, wherein.

DETAILED DESCRIPTION

In the ensuing description, one or more specific details are illustrated, aimed at providing an in-depth understanding of examples of embodiments of this description. The embodiments may be obtained without one or more of the specific details, or with other methods, components, materials, etc. In other cases, known structures, materials, or operations are not illustrated or described in detail so that certain aspects of embodiments will not be obscured.

Reference to "an embodiment" or "one embodiment" in the framework of the present description is intended to indicate that a particular configuration, structure, or characteristic described in relation to the embodiment is comprised in at least one embodiment. Hence, phrases such as "in an embodiment" or "in one embodiment" that may be present in one or more points of the present description do not necessarily refer to one and the same embodiment. Moreover, particular conformations, structures, or characteristics may be combined in any adequate way in one or more embodiments.

Throughout the figures annexed herein, like parts or elements are indicated with like references/numerals and a corresponding description will not be repeated for brevity.

The references used herein are provided merely for convenience and hence do not define the extent of protection or the scope of the embodiments.

Figure 3:
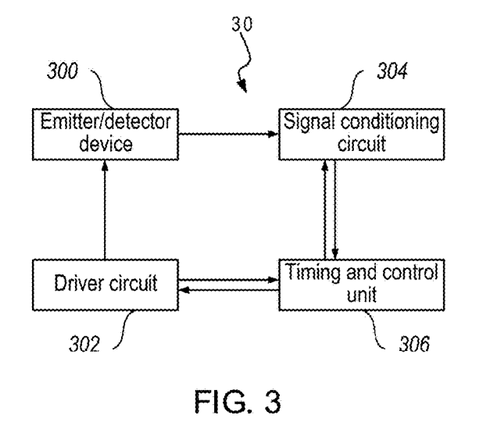
FIGS. 3 to 8 are schematic block diagrams exemplary of optical proximity sensors according to various embodiments.

FIG. 3 is a schematic block diagram exemplary of an optical proximity sensor 30 according to one or more embodiments. The sensor 30 may comprise a (solid-state) device 300 configured to operate both as a light emitter and as a light detector (e.g., a photo-electric converter device). For instance, the emitter/detector device 300 may comprise an array of single photon avalanche diodes (SPADs) or avalanche photodiodes (APDs), or a silicon photomultiplier (SiPM). By way of non-limiting example, the array may comprise between 100 and 10000 SPADs or APDs.

Additionally, the emitter/detector device 300 may comprise optical components such as lenses, coatings and layers with peculiar optical properties, which will be further described in the following.

The sensor 30 may comprise a driver circuit 302 configured for driving the emitter/detector device 300. In particular, the driver circuit 302 may comprise a modulation circuit configured for biasing the emitter/detector device 300 with a modulated signal, e.g., a periodic signal having a certain modulation frequency (for instance, in the range of 100 MHz to 3 GHz). The driver circuit 302 may be integrated on the same chip of the emitter/detector device 300, or may be implemented on a different chip and coupled to the emitter/detector device 300.

The sensor 30 may comprise a signal conditioning circuit 304 configured for receiving an output signal indicative of light intensity from the emitter/detector device 300 and conditioning said output signal, e.g., for subsequent processing in a digital or analog processing circuit. For instance, the signal conditioning circuit 304 may comprise an (analog) amplification stage, an analog-to-digital converter (ADC), and a logic interface to a processing circuit. The signal conditioning circuit 304 may be integrated on the same chip of the emitter/detector device 300, or may be implemented on a different chip and coupled to the emitter/detector device 300.

The sensor 30 may comprise a timing and control circuit 306 (which may be referred to herein as a timing and control unit 306) configured for generating one or more control signal(s) for the operation of the driver circuit 302, and/or for processing one or more conditioned signals received from the signal conditioning circuit 304. The timing and control unit 306 may thus be configured to control operation of the whole sensor 30. For instance, the timing and control unit 306 may comprise a microcontroller circuit (MCU).

Therefore, one or more embodiments may comprise a device 300 configured to operate both as a light emitter and as a light detector, which may advantageously result in reduced cost and/or complexity of the sensor 30.

In particular, the emitter/detector device 300 may comprise an array of SPADs or APDs, or a SiPM, biased with a reverse-bias voltage (well) above the breakdown voltage, which is notionally employed as a photodetector device.

It is noted that, in such operating condition, each SPAD or APD in the device 300 statistically stays in a "quiescent" state (i.e., it prevents a current from flowing therethrough) for a certain time interval, e.g., 1 ms (1 ms=$10^{-3}$ s). In fact, due to thermal noise in the emitter/detector device 300, the SPADs or APDs in the array may randomly generate avalanche events at a certain rate.

It is noted that an avalanche event taking place in a SPAD or APD may in turn result in emission of one or more photons from that SPAD or APD, i.e., an avalanche process in silicon may result in light emission. For instance, it is noted that during an avalanche process, about three photons may be emitted every $10^5$ carriers generated in the SPAD or APD. Since a SiPM may be operated with a certain gain factor, e.g., about $5·10^6$, approximately 150 photons may be emitted on average by each SPAD or APD during an avalanche process.

Therefore, an array of SPADs or APDs, or a SiPM, which is biased with a reverse-bias voltage above the breakdown voltage emits light with a certain intensity which may be a function of the biasing condition, insofar as the array of SPADs or APDs, or the SiPM, may comprise a high number of individual cells (e.g., hundreds or thousands of SPADs or APDs) so that, statistically, avalanche events happen at a constant rate even in absence of illumination, due to thermal generation of charge carriers.

Therefore, the light emitted from the array of SPADs or APDs, or the SiPM, due to thermal generation effects (which in turn may cause avalanche effects, which in turn may result in light emission) may be modulated over time (e.g., at a certain frequency) by modulating the biasing condition of the array of SPADs or APDs, or the SiPM.

For instance, in one embodiment, the biasing voltage of the array of SPADs or APDs, or the SiPM, may be (e.g., periodically) switched between (i.e., alternated between) a first value higher than the breakdown voltage and a second value lower than the breakdown voltage. Since light emission from the array of SPADs or APDs takes place when the biasing voltage is above the breakdown voltage, such a biasing modulation scheme may result in emission of a (e.g., periodically) modulated optical signal (a sort of ON/OFF modulation), with such emitted optical signal being received at the same array of SPADs or APDs, which may also operate as a light detector, after reflection at a target object.

Alternatively, the biasing voltage of the array of SPADs or APDs, or the SiPM, may be modulated between two values which are both higher than the breakdown voltage, but different from each other, thereby resulting in modulation of the intensity of a continuous optical signal.

In one or more embodiments, the distance D between the optical proximity sensor 30 and a target object may be calculated as $D=c \cdot \Delta\Phi/(2\omega_m)$ or $D=c \cdot \Delta\Phi/(2 \cdot 2\pi f_m)$ where $\omega_m$ is the modulation frequency of the emitted optical signal (in rad/s), $f_m$ is the modulation frequency of the emitted optical signal (in Hz, $\omega_m=2\pi f_m$) and $\Delta\Phi$ is the phase difference measured between the modulated optical signal emitted by the emitter/detector device 300 and the corresponding modulated optical signal received at the emitter/detector device 300 after reflection by the target object. Therefore, for a measurement system with a given phase accuracy (e.g., fixed by design), the modulation frequency may be selected to be as high as possible so as to result in better distance accuracy. In one embodiment, the distance D is calculated by the timing and control unit 306.

The modulation frequency $f_m$ may determine the ambiguity-free distance range L of the sensor, with $L=c/2f_m$. For instance, a modulation frequency of 300 MHz may result in a range of the sensor of approximately 0.5 m, and a modulation frequency of 1 GHz may result in a range of the sensor of approximately 0.15 m. In one or more embodiments, the modulation frequency $f_m$ may be selected in the range of 100 MHz to 3 GHz. For instance, the modulation frequency $f_m$ may be selected as a trade-off between a target distance accuracy and a target distance range of the sensor.

It is noted that APDs, SPADs and/or SiPMs may have good timing jitter performances (e.g., a few tens of picoseconds) which however may not be sufficient to provide distance accuracy at the millimeter scale for an optical proximity sensor 30.

Distance accuracy may be computed as $\sigma(d)=c \cdot \sigma(t)/2$, where $\sigma(t)$ is the uncertainty of a single time measurement, with $\sigma(t)=\sigma(\varphi)/2\pi f_m$ ($\sigma(\varphi)$ being the phase accuracy). In one or more embodiments, distance accuracy may be improved by increasing a number M of measurements, insofar as M measurements may be approximated as a collection of (e.g., independent and identically distributed) random variables. Therefore, time uncertainty may be reduced by a factor $\sqrt{M}$ by performing a number M of measurements, thereby resulting in a distance accuracy equal to $\sigma(d)=c \cdot \sigma(t)/(2 \cdot \sqrt{M})$. For instance, a distance accuracy $\sigma(d) \approx 0.3$ mm may be obtained with $\sigma(t) \approx 65$ ps and M=1000.

FIG. 3 is exemplary of an embodiment wherein the emitter/detector device 300, the driver circuit 302, the signal conditioning circuit 304 and the timing and control unit 306 are implemented on different chips.

Figure 4:
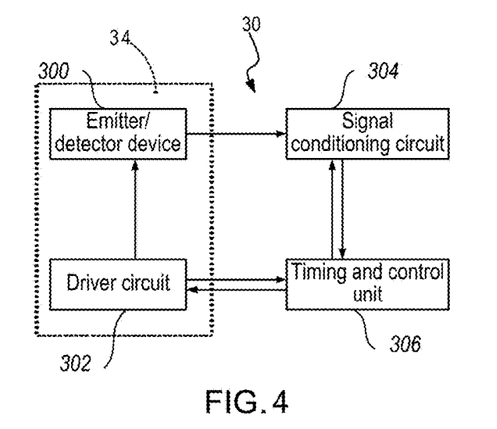

Alternatively, as exemplified in the schematic block diagram of FIG. 4, the emitter/detector device 300 and the driver circuit 302 may be implemented on the same chip 34.

Figure 5:
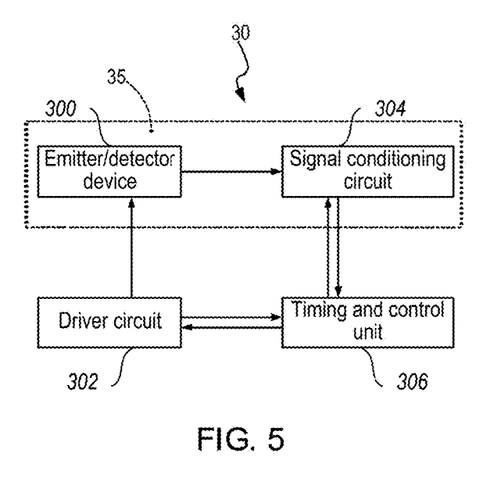

Alternatively, as exemplified in the schematic block diagram of FIG. 5, the emitter/detector device 300 and the signal conditioning circuit 304 may be implemented on the same chip 35.

Figure 6:
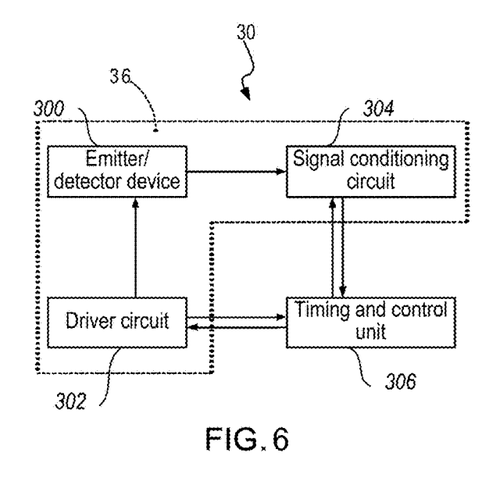

Alternatively, as exemplified in the schematic block diagram of FIG. 6, the emitter/detector device 300, the driver circuit 302 and the signal conditioning circuit 304 may be implemented on the same chip 36.

Figure 7:
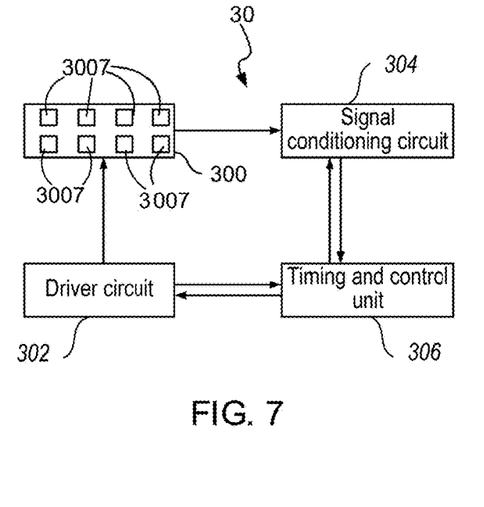

In one or more embodiments as exemplified in FIG. 7, the emitter/detector device 300 may comprise a plurality of light emitters/detectors 3007, e.g., a plurality of arrays of APDs or SPADs or a plurality of SiPMs. Providing a plurality of light emitters/detectors 3007 may facilitate executing a plurality M of measurements at the same time.

Figure 8:
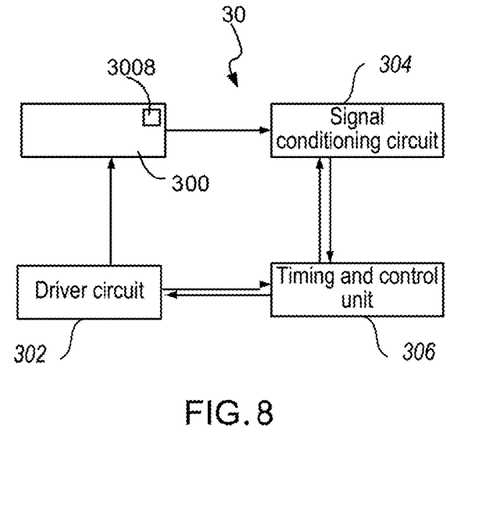

Additionally or alternatively, in one or more embodiments as exemplified in FIG. 8, the emitter/detector device 300 may comprise a reference channel 3008. Such a reference channel 3008 may be integrated (in a similar way as the plurality of arrays) in a single chip within the main device 30. For example, in some applications a reference channel 3008 may be useful for evaluating background light.

In one or more embodiments, the emitter/detector device 300 may be placed in a case to avoid background illumination.

Figure 9:
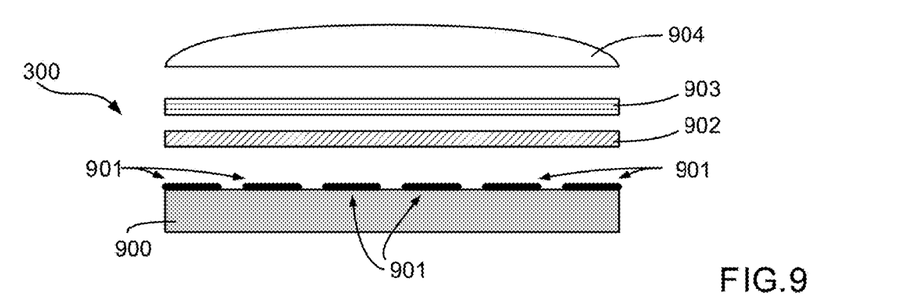
FIGS. 9 and 10 are exploded cross sections (side views) exemplary of implementation details of optical proximity sensors according to various embodiments.

As exemplified in the exploded side view of FIG. 9, the emitter/dector device 300 may comprise the following components/layers, which may be, for instance, discrete components:

901: array of APDs or SPADs, or SiPM,
902: anti-reflection coating,
903: background light (attenuation) filter, and
904: lens system.

Figure 10:
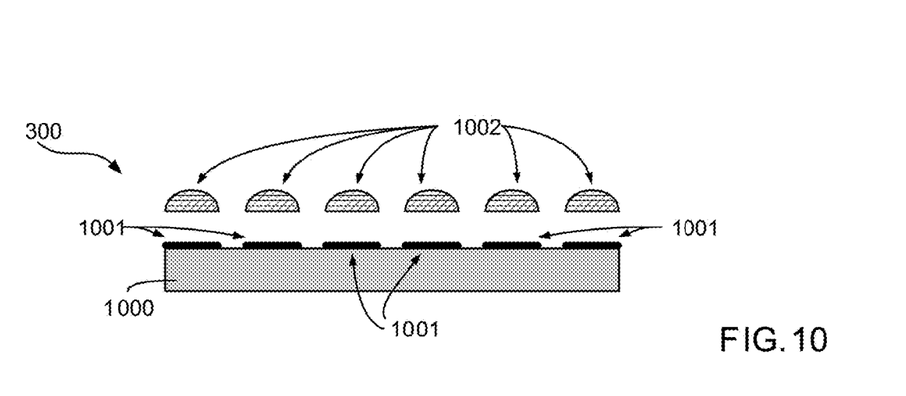

Alternatively, as exemplified in the exploded side view of FIG. 10, the optical components of the emitter/detector device 300 may be integrated by process integration. For instance, the emitter/detector device 300 may comprise a substrate 1000, an array of APDs or SPADs, or SiPM 1001, and a respective array of micro-lenses 1002 with integrated anti-reflection coating and background light (attenuation) filter.

In one or more embodiments, a metal layer (e.g., a tungsten layer) may be provided between adjacent APD or SPAD cells to avoid optical cross talk.

Of course, it will be understood that the embodiments exemplified in FIGS. 3 to 6 may be combined with any of the embodiments exemplified in FIG. 7, FIG. 8 and any of FIGS. 9 and 10.

One or more embodiments may thus provide one or more of the following advantages over the prior art:
good resolution for low-cost and short distance range applications,
compact and simplified system, due to the use of a device providing at the same time emission and detection of optical signals,
no need of mechanical alignment between light emitter and detector,
distance measurements independent from light intensity,
no need of calibration with distance or look-up tables,
no need of temperature calibration, insofar as the mechanical mismatch between emitter and detector is suppressed and the measurements are independent from light intensity, and thus independent from detector/emitter sensitivity.

As exemplified herein, an optical proximity sensor (e.g., 30) may comprise a solid-state photo-electric converter (e.g., 300), a biasing circuit (e.g., 302) for biasing the solid-state photo-electric converter, and a drive circuit (e.g., 306). The drive circuit may be configured to:

control the biasing circuit to apply to the solid-state photo-electric converter a bias signal modulated between a first value and a second value, the second value different from the first value, wherein a modulated optical signal is emitted by the solid-state photo-electric converter towards a target object, receive (e.g., 304) an electrical output signal from the solid-state photo-electric converter, the electrical output signal being a function of a modulated optical signal received at the solid-state photo-electric converter as a result of reflection of said emitted modulated optical signal at said target object, perform a phase comparison of said modulated bias signal applied to the photo-electric converter against said electrical output signal received from the solid-state photo-electric converter and produce, as a result of said phase comparison, a phase shift signal which is a function of the phase shift between said modulated optical signal emitted by the solid-state photo-electric converter and the modulated optical signal received at the solid-state photo-electric converter, and compute a distance between the optical proximity sensor and said target object as a function of said phase shift signal.

As exemplified herein, the biasing circuit may comprise a modulation circuit configured to modulate periodically said bias signal between said first value and said second value at a frequency of 100 MHz to 3 GHz (e.g., comprised between 100 MHz and 3 GHz), wherein an optical signal periodically modulated at a frequency of 100 MHz to 3 GHz is emitted by the solid-state photo-electric converter.

As exemplified herein, the first value of the bias signal may be higher than a breakdown voltage of the solid-state photo-electric converter and the second value of the bias signal may be lower than the breakdown voltage of the solid-state photo-electric converter.

As exemplified herein, both the first value and the second value of the bias signal may be higher than the breakdown voltage of the solid-state photo-electric converter.

As exemplified herein, the optical proximity sensor may comprise a conditioning circuit (e.g., 304) configured for conditioning the electrical output signal from the solid-state photo-electric converter and providing a conditioned electrical signal to the drive circuit.

As exemplified herein, at least two of the solid-state photo-electric converter, the biasing circuit and the conditioning circuit may be implemented on a same semiconductor chip (e.g., 34; 35; 36).

As exemplified herein, the solid-state photo-electric converter may comprise:

an anti-reflection coating (e.g., 902),
a background light attenuation filter (e.g., 903), and
a lens (e.g., 904).

As exemplified herein, the solid-state photo-electric converter may comprise at least one of:

an array of single photon avalanche diodes,
an array of avalanche photodiodes, and
a silicon photomultiplier.

As exemplified herein, the solid-state photo-electric converter may comprise a respective array of lenses (e.g., micro-lenses 1002, positioned at locations corresponding to the locations of the diodes 1001 in the array), the lenses in the array of lenses having an anti-reflection coating and a background light attenuation filter incorporated therein.

As exemplified herein, the solid-state photo-electric converter may comprise a reference channel (e.g., 3008) configured to evaluate background light (e.g., the intensity thereof).

As exemplified herein, the drive circuit may be configured to:

perform a plurality of phase comparisons of said modulated bias signal applied to the photo-electric converter against said electrical output signal received from the solid-state photo-electric converter and produce a respective plurality of values of said phase shift signal, and compute a distance between the optical proximity sensor and said target object as a function of (e.g., averaging) said plurality of values of said phase shift signal.

As exemplified herein, a method of operating an optical proximity sensor according to one or more embodiments may comprise:

applying to the solid-state photo-electric converter a bias signal modulated between a first value and a second value, the second value different from the first value, wherein a modulated optical signal is emitted by the solid-state photo-electric converter towards a target object, receiving an electrical output signal from the solid-state photo-electric converter, the electrical output signal being a function of a modulated optical signal received at the solid-state photo-electric converter as a result of reflection of said emitted modulated optical signal at said target object, performing a phase comparison of said modulated bias signal applied to the photo-electric converter against said electrical output signal received from the solid-state photo-electric converter, producing, as a result of said phase comparison, a phase shift signal which is a function of the phase shift between the modulated optical signal emitted by the solid-state photo-electric converter and the modulated optical signal received at the solid-state photo-electric converter, and computing a distance between the optical proximity sensor and said target object as a function of said phase shift signal.

Without prejudice to the underlying principles, the details and embodiments may vary, even significantly, with respect to what has been described by way of example without departing from the extent of protection.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. An optical proximity sensor comprising:
a solid-state photo-electric converter;
a biasing circuit configured to bias the solid-state photo-electric converter; and a control circuit, wherein the control circuit is configured to:
control the biasing circuit to apply, to the solid-state photo-electric converter, a bias signal modulated between a first value and a second value, the second value different from the first value, both the first value and the second value being higher than a breakdown voltage of the solid-state photo-electric converter, wherein a modulated optical signal is emitted by the solid-state photo-electric converter towards a target object in response to the bias signal being applied to the solid-state photo-electric converter,
receive an electrical output signal from the solid-state photo-electric converter, the electrical output signal being a function of a received modulated optical signal that is received at the solid-state photo-electric converter as a result of reflection of the modulated optical signal emitted towards the target object,
perform a phase comparison of the bias signal applied to the solid-state photo-electric converter against the electrical output signal received from the solid-state photo-electric converter,
produce a phase shift signal based on the phase comparison, the phase shift signal being a function of a phase shift between the modulated optical signal emitted towards the target object and the received modulated optical signal that is received at the solid-state photo-electric converter, and
compute a distance between the optical proximity sensor and the target object as a function of the phase shift signal.

2. The optical proximity sensor of claim 1, wherein the biasing circuit includes a modulation circuit configured to modulate periodically the bias signal between the first value and the second value at a frequency between 100 MHz and 3 GHz, and the modulated optical signal emitted towards the target object is periodically modulated at the frequency between 100 MHz and 3 GHz.

3. The optical proximity sensor of claim 1, further comprising:
a conditioning circuit configured to condition the electrical output signal from the solid-state photo-electric converter, and provide a conditioned electrical signal to the control circuit.

4. The optical proximity sensor of claim 3, wherein at least two of the solid-state photo-electric converter, the biasing circuit, or the conditioning circuit are implemented on a same semiconductor chip.

5. The optical proximity sensor of claim 1, wherein the solid-state photo-electric converter includes an anti-reflection coating, a background light attenuation filter, and a lens.

6. The optical proximity sensor of claim 1, wherein the solid-state photo-electric converter includes at least one of an array of single photon avalanche diodes, an array of avalanche photodiodes, or a silicon photomultiplier.

7. The optical proximity sensor of claim 6, wherein the solid-state photo-electric converter includes an array of lenses, each lens in the array of lenses having an anti-reflection coating and a background light attenuation filter incorporated therein.

8. The optical proximity sensor of claim 1, wherein the solid-state photo-electric converter includes a reference channel used to evaluate a background light.

9. The optical proximity sensor of claim 1, wherein the control circuit is configured to:
perform a plurality of phase comparisons of the modulated bias signal applied to the photo-electric converter against the electrical output signal received from the solid-state photo-electric converter, and produce a plurality of values of the phase shift signal based on the plurality of phase comparisons, and
compute a distance between the optical proximity sensor and the target object as a function of the plurality of values of the phase shift signal.

10. The optical proximity sensor of claim 1, wherein the distance is between 0.5 m and 0.15 m.

11. A method of operating an optical proximity sensor, the method comprising:
applying, to a solid-state photo-electric converter of the optical proximity sensor, a bias signal modulated between a first value and a second value, the second value different from the first value, both the first value and the second value being higher than a breakdown voltage of the solid-state photo-electric converter, wherein a modulated optical signal is emitted by the solid-state photo-electric converter towards a target object in response to the bias signal being applied to the solid-state photo-electric converter;
receiving an electrical output signal from the solid-state photo-electric converter, the electrical output signal being a function of a received modulated optical signal that is received at the solid-state photo-electric converter as a result of reflection of the modulated optical signal emitted towards the target object;
performing a phase comparison of the modulated bias signal applied to the solid-state photo-electric converter against the electrical output signal received from the solid-state photo-electric converter;
producing a phase shift signal based on the phase comparison, the phase shift signal being a function of a phase shift between the modulated optical signal emitted towards the target object and the received modulated optical signal that is received at the solid-state photo-electric converter; and
computing a distance between the optical proximity sensor and the target object as a function of the phase shift signal.

12. The method of claim 11, wherein the bias signal is modulated between the first value and the second value at a frequency between 100 MHz and 3 GHz.

13. The method of claim 11, further comprising:
conditioning the electrical output signal from the solid-state photo-electric converter with a conditioning circuit; and
providing a conditioned electrical signal to the control circuit.

14. A proximity sensor, comprising:
a substrate;
an optical sensor on the substrate, the optical sensor configured to emit a modulated optical signal towards a target object in response to a bias signal being applied to the optical sensor, and detect a reflected modulated optical signal that is received by the optical sensor as a result of the modulated optical signal being reflected off of the target object;
a driver circuit on the substrate, the driver circuit configured to apply the bias signal to the optical sensor, the bias signal alternating between a first value and a second value different from the first value, both the first value and the second value being higher than a breakdown voltage of the optical sensor; and a control circuit configured to calculate a phase shift between the modulated optical signal and the reflected modulated optical signal, and determine a distance between the proximity sensor and the target object based on the phase shift.

15. The proximity sensor of claim 14, further comprising:
a signal conditioning circuit on the substrate, the signal conditioning circuit configured to process the reflected modulated optical signal for the control circuit, the signal conditioning circuit including at least one of an amplified, an analog-to-digital converter, or a logic interface.

16. The proximity sensor of claim 14, further comprising:
an anti-reflection coating on the optical sensor;
a filter on the anti-reflection coating; and
a lens on the filter.

17. The proximity sensor of claim 14, wherein the bias signal alternates between the first value and the second value at a frequency between 100 MHz and 3 GHz.

18. The proximity sensor of claim 14, wherein
the optical sensor includes at least one of an array of single photon avalanche diodes, an array of avalanche photodiodes, or a silicon photomultiplier.

* * * * *